United States Patent [19]

Huang et al.

[11] Patent Number: 5,258,346
[45] Date of Patent: Nov. 2, 1993

[54] NICKEL HYDROGENATION CATALYST

[75] Inventors: Dinah C. Huang, Prospect; Edward K. Dienes; Jon P. Wagner, both of Louisville, all of Ky.

[73] Assignee: United Catalysts Inc., Louisville, Ky.

[21] Appl. No.: 912,513

[22] Filed: Jul. 13, 1992

[51] Int. Cl.$^5$ .......................... B01J 23/76; B01J 21/14
[52] U.S. Cl. ....................................... 502/252; 502/243
[58] Field of Search ....................... 502/252, 259, 243

[56] References Cited

U.S. PATENT DOCUMENTS

| | | | |
|---|---|---|---|
| 3,697,445 | 10/1972 | Carter | 502/259 |
| 3,991,127 | 11/1976 | Corr et al. | 502/259 |
| 4,670,416 | 6/1987 | Klimmek et al. | 502/259 |
| 5,087,599 | 2/1992 | Botman et al. | 502/259 |
| 5,155,084 | 10/1992 | Horn et al. | 502/259 |

FOREIGN PATENT DOCUMENTS 712567  6/1965  Canada .................. 502/259

*Primary Examiner*—Carl F. Dees
*Attorney, Agent, or Firm*—Herbert P. Price

[57] ABSTRACT

An extruded nickel oxide on refractory oxide hydrogenation catalyst, having, in its reduced state, a nickel surface area greater than 30 m$^2$/gm of reduced nickel in the catalyst and 15 to about 65 volume percent of pores having diameters of about 300 to about 1000 angstroms, is highly active for the hydrogenation of aromatics in heavy hydrocarbon streams and is relatively resistant to sulfur poisoning.

6 Claims, No Drawings

NICKEL HYDROGENATION CATALYST

BACKGROUND OF THE INVENTION

The field of art to which this invention is directed is catalysts for the hydrogenation of aromatic compounds.

Nickel catalysts have been widely used to catalyze the hydrogenation of aromatic compounds.

U.S. Pat. No. 3,461,181 discloses a process for hydrogenating aromatic compounds using a catalyst containing 2–60 percent nickel, 2–80 percent sodium or alkaline earth fluoride and 12–96 percent silica or alumina.

Catalysts for the hydrogenation of benzene are disclosed in U S. Pat. No. 3,622,645. These catalysts, which are comprised of 5 to 90 percent nickel on kieselguhr, have particle sizes of not more than one-tenth inch in diameter.

Nickel or cobalt on silica catalysts for the hydrogenation of aromatic compounds are described in U.S. Pat. No. 3,661,798. Such catalysts, when deactivated by sulfur, can be regenerated by heating the catalyst in the presence of oxygen followed by contacting the catalyst with liquid water and then hydrogen.

A process for hydrogenating aromatic compounds using nickel/silica catalysts, wherein the nickel surface area is greater than 70 $m^2$/gm of catalyst and the sodium content is less than 0.2 weight percent, is described in U.S. Pat. Nos. 3,859,370 and 3,868,332.

The hydrogenation of aromatic compounds using sodium borohydride reduced nickel supported catalysts is described in U.S. Pat. No. 3,869,521.

Nickel-alumina catalysts having a high degree of thermal stability are described in U.S. Pat. No. 4,042,532.

Highly active hydrogenation catalysts made with nickel on a refractory oxide are described in U.S. Pat. No. 4,160,745.

Nickel on gamma-alumina catalysts are disclosed in U.S. Pat. No. 4,490,480. These catalysts have a nickel surface area of between 80 and 300 $m^2$/gm of reduced nickel in the catalyst wherein the nickel crystallites have an average diameter of 10 to 50 angstroms.

In Canadian Patent No. 1,080,685, hydrogenation catalysts are described which are comprised of, for example, 45 percent nickel, 5 percent copper and 50 percent silica having a nickel surface area of 50 to 100 $m^2$/gm of catalyst and a total surface area of 150 to 300 $m^2$/gm.

In Netherlands Patent application 67 14,401, hydrogenation catalysts are prepared by mixing a nickel or cobalt salt solution with a stabilized silica sol, precipitating a composite by adding base, filtering, drying, calcining and treating with hydrogen in situ at 300° C.

Catalysts for the hydrogenation of alkyl benzenes are disclosed in Netherlands Patent Application 6,913,613. Nickel nitrate is precipitated onto aerosil using urea, followed by calcination and reduction at 450° C. The catalysts have a nickel crystallite size of 50 angstroms.

One of the problems that arises in the hydrogenation of aromatic hydrocarbon feedstocks is rapid catalyst deactivation due to poisoning by sulfur compounds in the feedstock. The problem is very pronounced in the hydrogenation of aromatic hydrocarbons in heavy or high boiling hydrocarbon fractions which contain large organosulfur molecules, such as benzothiophene and dibenzothiophene. Such large sulfur containing molecules can block the pores in the catalyst resulting in rapid loss of catalyst activity.

A good hydrogenation catalyst should be reasonably sulfur resistant so that it will be able to maintain good hydrogenation activity for an extended period of time when used in reactions involving sulfur-containing feedstocks. The catalyst must be effective in picking up sulfur so that the inlet portion of the catalyst bed can act as a guard to provide protection to the remaining catalyst bed to obtain longer overall catalyst life.

A highly active catalyst should be in the form of small extrusions or certain specifically designed shapes with high outer geometrical surface area. The nickel content of the catalyst should be relatively high for the hydrogenation of aromatics in heavy hydrocarbon feedstocks so as to have the maximum possible nickel surface area for extra sulfur resistance.

An ideal catalyst for the hydrogenation of heavy feedstocks not only should have a high nickel surface area but should have a proper distribution of macro, meso and micropores for optimum porosity as well as good catalyst crush strength.

SUMMARY OF THE INVENTION

This invention is directed to nickel containing hydrogenation catalysts. In particular, this invention pertains to a nickel-refractory oxide hydrogenation catalyst. The hydrogenation catalysts of this invention are particularly effective for the hydrogenation of heavy aromatic compounds.

The hydrogenation catalysts of this invention are extrusions comprising about 10 to about 90 weight percent nickel oxide on a refractory oxide which may be optionally modified with alkali or alkaline earth metal oxides or rare earth metal oxides wherein said catalysts in the reduced state have nickel surface areas of about 30 $m^2$gm to about 130 $m^2$/gm of reduced nickel in the catalyst and pore volumes of about 0.2 to about 0.8 cubic centimeter per gram of catalyst, wherein about 15 to about 65 volume percent of the pores have diameters in the range of about 300 to about 1000 angstroms, about 1 to about 25 volume percent have diameters above 1000 angstroms with the remainder being below 300 angstroms as determined by mercury porosimetry.

DESCRIPTION OF THE INVENTION

The hydrogenation catalyst of this invention is an extruded catalyst comprised of about 10 to about 90 weight percent nickel oxide on a refractory oxide wherein said weight percent is based on the weight of the catalyst. Preferably the catalyst contains about 50 to about 70 weight percent nickel oxide. Although primarily a nickel oxide catalyst, it can be modified with minor amounts, up to about 50 weight percent, based on the weight of catalyst, of other active metal oxides, such as copper oxide, cobalt oxide, tungsten oxide and tin oxide. The catalyst can also contain up to 10 weight percent binder materials, e.g., bentonite, well known to those skilled in the art.

The refractory oxides which are used as carriers for the nickel oxide are silica and alumina. Mixtures of the two oxides can be used, wherein the mixture can contain up to equal amounts of each refractory oxide. Modification with up to 40 weight percent of alkali metal oxides, alkaline earth metal oxides, or rare earth metal oxides, or mixtures of these can also be made for specific applications. The preferred refractory oxide is silica. The preferred modification is with magnesium oxide.

The catalyst of this invention is preferably in extrudates having a diameter of about 1 mm to about 3mm and a length of about 2mm to about 8mm.

An important feature of the catalyst is its porosity and pore size distribution. The catalyst in its reduced state has a total pore volume of about 0.2 to about 0.8 cubic centimeter per gram (cc/gm) and preferably about 0.3 to about 0.6 cc/gm. The pore volume greater than about 300 angstroms is about 0.1 to about 0.6 cc/gm. The pore volume distribution is as follows: about 15 to about 65 volume percent of the pores have diameters in the range of about 300 to about 1000 angstroms, about 1 to about 25 volume percent have diameters above 1000 angstroms with the remainder being below 300 angstroms. Preferably, the ranges are:

| Diameter | Range |
| --- | --- |
| >1000 | 5-15% |
| 300-1000 | 30-55% |
| <300 | 30-65% |

In addition to proper pore structure, in order for the catalyst to have good activity, the active metal or metals must be prepared in such a way that the active metals are highly dispersed on the carrier. The combination of high metal surface area and favorable pore structure contribute to the catalyst's excellent activity and sulfur resistance. The specific metal surface area on the catalyst surface that is available for the hydrogenation reaction can be determined by chemisorption measurements with hydrogen. The catalyst of this invention has a nickel surface area of about 30 $m^2$ to about 130 $m^2$ per gram of reduced nickel in the catalyst, and preferably greater than about 50 $m^2$ per gram of reduced nickel.

The catalyst of this invention can be prepared by various methods which involve procedures for bringing the nickel oxide promoter and the refractory oxide, or precursors thereof, together followed by extrusion and calcination. Precursors of nickel oxide include the various salts, such as nickel nitrate, oxalate, hydroxide, or carbonate, which decompose to nickel oxide upon calcination, or nickel ammine carbonate which decomposes in the precipitation process. The refractory oxides can be used as the oxides in powder form or as gels, sols, silicates or aluminates. Magnesium oxide can be added either as the oxide or salts, such as magnesium nitrate, magnesium carbonate, or magnesium hydroxide.

Uniform mixing of the nickel oxide or precursor and the refractory oxide or precursor can be achieved either by mechanical mixing of the oxides or by co-precipitation of the nickel onto the refractory oxide carrier. Various methods of precipitations can be used including constant and varied pH precipitations as well as decomposition of nickel ammine carbonate.

The precursors of nickel oxide and refractory oxide are separated from the aqueous medium, and then are dried, extruded and calcined. The extrudates have a diameter of about 1 mm to about 3mm and a length of about 2mm to about 8mm. Calcination is conducted at a temperature of about 200° to about 400° C. for a period of about 4 to about 16 hours.

The catalysts of this invention are particularly useful in the hydrogenation of heavy hydrocarbon feedstocks containing naphthalenes and having a sulfur content of about 1-30 parts per million by weight.

This invention is described in more detail by the following examples. Parts and percentages are by weight unless otherwise designated.

EXAMPLE 1

To a suitable reactor was added a solution of 82 gms of $Al_2O_3$ as $NaAlO_2$ and 82 gms of amorphous $SiO_2$ in 5 liters of deionized water. To this solution was added a solution of 252 gms of nickel as $Ni(NO_3)_2$ dissolved in 5 liters of water. Agitation was applied and the temperature was raised to 85°-90° C. Sodium carbonate, 272 gms, was slowly added followed by heating at 90° C. for 3 hours. After the precipitation was completed, the slurry was filtered and washed with water until the sodium in the filter cake was less than 0.05 percent. The washed filter cake was then formed into 1.6 mm extrudates and was calcined at 340° C. for 4 hours. The resulting catalyst contained 71 percent NiO, 18 percent $Al_2O_3$ and 11 percent $SiO_2$. The nickel surface area of the catalyst was 59 $m^2$ per gram of reduced nickel.

The total pore volume of the catalyst after reduction was 0.53 cc/gm. The pore volume distribution was as follows:

| Diameter of pores (Angstroms) | % Pore Volume |
| --- | --- |
| >1000 | 6.9 |
| 300-1000 | 47.6 |
| 100-300 | 18.8 |
| <100 | 26.7 |

EXAMPLE 2

A solution of 113 gms of $SiO_2$ as $Na_2SiO_3 5H_2O$ in 5 liters of water was mixed and reacted with a solution of 267 gms of nickel as $Ni(NO_3)_2$ in 5 liters of water. The precipitation was carried out with the addition of sodium carbonate using the procedure described in Example 1. The resulting catalyst contained 75 percent NiO and 25 percent $SiO_2$.

The nickel surface area of the catalyst was 80 $m^2$ per gram of reduced nickel. The total pore volume of the catalyst was 0.39 cc/gm. The pore volume distribution was as follows:

| Diameter of pores (Angstroms) | % Pore Volume |
| --- | --- |
| >1000 | 7.0 |
| 300-1000 | 35.9 |
| 100-300 | 39.2 |
| <100 | 17.9 |

Example 3

A solution was prepared from 113 gms of $SiO_2$ as $Na_2SiO_3.5H_2O$ diluted to a volume of 3 liters with deionized water. This solution was designated Solution No. 1.

A second solution was made with 57 gms of MgO as $Mg(NO_3)_2$ $5H_2O$ diluted to a volume of 750 ml with deionized water. This solution was designated as Solution No. 2.

A third solution was prepared from 223 gms of nickel as $Ni(NO_3)$ diluted to a volume of 3 liters with deionized water. This solution was designated as Solution No. 3.

A fourth solution was prepared from 109 gms of $Na_2CO_3$ dissolved in 800 ml of deionized water. This solution was designated as Solution No. 4.

To a suitable reactor was added Solution No. 1. Solution No. 2 was added with mixing to the reactor followed by Solution No. 3. The temperature was raised to 85°-90° C. Solution No. 4 was then added to the reactor and precipitation was conducted using the procedure described in Example 1. The resulting catalyst contained 62.5 percent NiO, 25 percent SiO$_2$ and 12.5 percent MgO.

The total pore volume of the catalyst was 0.40 cc/gm. The pore volume distribution was as follows:

| Diameter of pores (Angstroms) | % Pore Volume |
| --- | --- |
| >1000 | 4.0 |
| 300–1000 | 57.1 |
| 100–300 | 22.8 |
| <100 | 16.1 |

EXAMPLE 4

A catalyst sample was prepared using 249 grams of nickel as Ni(NO$_3$)$_2$, 91 grams of SiO$_2$ as Na$_2$SiO$_3$.5H$_2$O and 45 grams of MgO as Mg(NO$_3$)$_2$.5H$_2$O following the same procedure as Example 3. The resulting catalyst contained 70 percent NiO, 20 percent SiO$_2$ and 10 percent MgO.

The nickel surface area of the catalyst was 123 m$^2$ per gram of reduced nickel. The total pore volume of the catalyst after reduction was 0.54 cc/gm. The pore volume distribution was as follows:

| Diameter of pores (Angstroms) | % Pore Volume |
| --- | --- |
| >1000 | 5.5 |
| 300–1000 | 50.8 |
| 100–300 | 18.5 |
| >100 | 25.2 |

EXAMPLE 5

To 5 liters of boiling water was added a mixture of 223 gms of nickel as Ni(NH$_3$)$_6$ CO$_3$, 113 gms of SiO$_2$ as silica sol and 57 gms of MgO. After the decomposition was completed, the resulting slurry was filtered. The filter cake was formed into 1.6 mm extrudates and calcined at 340° C. for 4 hours. The resulting catalyst contained 62.5 percent NiO, 25 percent SiO$_2$ and 12.5 percent MgO.

The total pore volume of the catalyst was 0.61 cc/gm. The pore volume distribution was as follows:

| Diameter of pores (Angstroms) | % Pore Volume |
| --- | --- |
| >1000 | 36.4 |
| 300–1000 | 17.2 |
| 100–300 | 16.4 |
| <100 | 30.0 |

EXAMPLE 6

To a suitable reactor were added 231 gms of nickel as Ni(NO$_3$)$_2$ diluted to 2 liters with water. The solution was heated to 90° C. and 109 gms of Na$_2$CO$_3$ in 800 ml of water were added. With the pH adjusted to 7, the nickel precipitated as nickel hydroxy carbonate. After complete precipitation, 113 gms of NaSiO$_3$ 5H$_2$O were added. After thorough mixing, the precipitates were filtered and washed until the sodium concentration was <0.05 percent. The filter cake was calcined at 340° C. for 4 hours. Gelled Al$_2$O$_3$, 45 gms, was added and thoroughly mixed. The mixture was then extruded into 1.6 mm extrudates. The resulting catalyst contained 65 percent NiO, 25 percent SiO$_2$ and 10 percent Al$_2$O$_3$.

The nickel surface area of the catalyst was 72 m$^2$ per gram of reduced nickel. The total pore volume of the catalyst was 0 47 cc/gm. The pore volume distribution was as follows:

| Diameter of pores (Angstroms) | % Pore Volume |
| --- | --- |
| >1000 | 9.3 |
| 300–1000 | 16.8 |
| 100–300 | 45.4 |
| <100 | 28.5 |

EXAMPLE 7

The catalysts of Example 1, 2, 4 and 6 were activated with hydrogen and were then evaluated as hydrogenation catalysts for a synthetic feed containing 30 percent 1-methyl naphthalene, 35 percent dodecane and 35 percent cyclohexane. The feed also contained 60 ppmw of sulfur. 45 ml of the catalyst which had been pre-reduced at 420° C. were loaded into reactor tubes of ⅜ inch inside diameter. The hydrogenation reactions were conducted at 190° C. at 350 psig, LHSV of 2.0 Vol/Vol/hr and H$_2$ rate of 1,500 SCF/Bbl. The percent conversion of 1-methyl naphthalene to saturated compounds

| Hours on stream | Cat 1 | Cat 2 | Cat 4 | Cat 6 |
| --- | --- | --- | --- | --- |
| 4 | 99.8 | 96.9 | 99.6 | 81.0 |
| 20 | 82.4 | 91.3 | 88.5 | 78.2 |
| 28 | 69.3 | 86.4 | 80.5 | 57.0 |
| 44 | 62.0 | 77.8 | 75.7 | |
| 52 | 60.3 | 74.8 | 61.9 | |

As can be seen the catalysts of the invention, Catalysts 1, 2 and 4, were superior to catalyst 6 which had pore distributions outside the scope of the invention.

EXAMPLE 8

The catalysts of Examples 1 through 6 were evaluated after activation as hydrogenation catalysts for a heavy hydrocarbon feedstock. The hydrogenation reactions were conducted at 177° C., at 450 psig, LHSV of 3.0 vol/vol/hr and H$_2$ rate of 1,500 SCF/Bbl.

The feed had a distillation range of 239°–266° C. It contained approximately 30 weight percent aromatics and 4 ppmw sulfur. The percent conversions of the aromatics to saturated hydrocarbons were as follows:

| Hours on stream | Cat 1 | Cat 2 | Cat 3 | Cat 4 | Cat 5 | Cat 6 |
| --- | --- | --- | --- | --- | --- | --- |
| 24 | 83 | 82 | 80 | 80 | 80 | 72 |
| 48 | 74 | 76 | 75 | 78 | 74 | 68 |
| 72 | 75 | 78 | 74 | 77 | 66 | 63 |

As can be seen, Catalyst 1, 2, 3 and 4 are superior in performance to Catalyst 6 and somewhat better than Cat 5. Catalyst 5 which has percent pore volume of large pores (>1000 angstroms) outside the scope of the invention has reasonably good activity. However, due to the large number of large pores, the crush strength of the catalyst is unacceptable.

The principles, preferred embodiments and modes of operation of the present invention have been described in the foregoing specification. The invention which is intended to be protected herein, however, is not to be construed as limited to the particular forms disclosed, since these are to be regarded as illustrative rather than restrictive. Variations and changes may be made by those skilled in the art without departing from the spirit of the invention.

What is claimed is:

1. An extruded hydrogenation catalyst comprising about 10 to about 90 weight percent, based on the weight of the catalyst, nickel oxide on a refractory oxide wherein said catalyst in the reduced state has a nickel surface area of about 30 $m^2$/gm to about 130 $m^2$/gm of reduced nickel in the catalyst and a pore volume of about 0.2 to about 0.8 cubic centimeters per gram of catalyst, wherein about 15 to about 65 volume percent of the pores have diameters in the range of about 300 to about 1000 angstroms, about 1 to about 25 volume percent of pores have diameters above 1000 angstroms with the remainder of the pores being below 300 angstroms.

2. The catalyst of claim 1 having a nickel surface area greater than 50 $m^2$/gm of reduced nickel in the catalyst and a pore volume of about 0.3 to about 0.6 cc/gm.

3. The catalyst of claim 2 wherein the pore volume distribution in the ranges of >1000 angstrom diameter pores is about 5 to about 15%, 300–1000 angstroms diameter pores is about 30 to about 55% and <300 angstrom diameter pores is about 30 to about 65%.

4. The catalyst of claim 1 having a diameter of about 1 to about 3 mm and a length of about 2 to about 8 mm.

5. The catalyst of claim 1 wherein the refractory oxide is modified with alkali metal oxides, alkaline earth metal oxides, or rare earth metal oxides or mixtures thereof.

6. The catalyst of claim 5 wherein the refractory oxide is silica modified with magnesium oxide.

* * * * *